United States Patent [19]

Kaga et al.

[11] Patent Number: 5,620,637

[45] Date of Patent: Apr. 15, 1997

[54] PREPARATION OF SINTERED ZIRCONIA BODY

[75] Inventors: Takao Kaga; Yuzi Hoshi; Yutaka Kimura, all of Funabashi, Japan

[73] Assignee: Nissan Chemical Industries, Ltd., Tokyo, Japan

[21] Appl. No.: 343,881

[22] Filed: Nov. 17, 1994

Related U.S. Application Data

[63] Continuation of Ser. No. 35,404, Mar. 23, 1993, abandoned.

[30] Foreign Application Priority Data

Mar. 25, 1992 [JP] Japan .................................. 4-067065

[51] Int. Cl.$^6$ .................................................. C04B 35/48
[52] U.S. Cl. .................. 264/57; 264/56; 264/61
[58] Field of Search ................... 264/56, 61, 57

[56] References Cited

U.S. PATENT DOCUMENTS

| | | | |
|---|---|---|---|
| 3,879,509 | 4/1975 | Elderbaum | 264/56 |
| 4,340,436 | 7/1982 | Dubetsky | 264/61 |
| 4,849,142 | 7/1989 | Panda et al. | |
| 5,130,067 | 7/1992 | Flaitz | 264/61 |
| 5,194,196 | 3/1993 | Chance | 264/61 |

FOREIGN PATENT DOCUMENTS

| | | |
|---|---|---|
| 0043955 | 6/1981 | European Pat. Off. . |
| 0237198 | 2/1987 | European Pat. Off. . |
| 0243858 | 4/1987 | European Pat. Off. . |
| 3088776 | 4/1991 | Japan . |
| 3141164 | 6/1991 | Japan . |

*Primary Examiner*—James Derrington
*Attorney, Agent, or Firm*—Birch, Stewart, Kolasch & Birch, LLP

[57] ABSTRACT

A sintered zirconia sheet is prepared by firing a green sheet of zirconia while placing at least one weight on the sheet to apply a load thereto. Preferably a weight made of a porous material having a porosity of 5 to 30% and having a weight per unit area W (g/cm$^2$) and a surface area S (cm$^2$) is placed on the sheet to apply a load per unit area G (g/cm$^2$) to the sheet under the conditions: $S \leq 200$, $G \leq 5$, and $W/G \geq 0.5$. Sintered zirconia sheets free of camber, distortion or cracking are obtained, particularly when their dimensions are at least 15 cm×15 cm and up to 0.5 mm thick.

18 Claims, No Drawings

PREPARATION OF SINTERED ZIRCONIA BODY

This application is a continuation of application Ser. No. 08/035,404 filed on Mar. 23, 1993, now abandoned.

BACKGROUND OF THE INVENTION

Field of the Invention

The present invention relates to a method for preparing a sintered zirconia body in sheet form having length, width and thickness dimensions characterized by a high surface area to thickness ratio and a high length to thickness ratio.

Sheets of sintered zirconia body were prepared by various well-known methods including doctor blade, calender roll and extrusion methods. The doctor blade method involves dispersing zirconia powder in an organic binder and a solvent, applying the resulting slurry onto a carrier tape to a uniform thickness by means of a doctor blade, drying to evaporate off the solvent, and solidifying into a green sheet. The green sheet is then cut, punched or otherwise worked and fired into a sintered sheet.

The thus obtained sheet form of sintered body is liable to camber or become wavy as its thickness is reduced, particularly when green sheets prepared from submicron zirconia particles are fired. Where sintered sheets have a practically unacceptable extent of camber or waviness, such camber or waviness must be compensated for, for example, by re-firing the sheet under a preselected load. However, two or more steps of firing are undesirable from the aspect of energy saving. Also, application of a load to cambered or wavy sintered sheets can cause cracking and breakage of the sheets, resulting in low manufacture yields. Additionally, as the surface area to thickness ratio or length to thickness ratio of sheets increases, the influence of camber or waviness during firing is enhanced, to resulting in more frequent occurrence of cracking or breakage.

SUMMARY OF THE INVENTION

Therefore, an object of the present invention is to provide a novel and improved method for preparing a sintered zirconia sheet having a high surface area to thickness ratio and a high length to thickness ratio by firing while eliminating camber or waviness from the sheet. Another object of the present invention is to provide a novel and improved method for preparing a sintered zirconia sheet free of camber, distortion or cracks, and having improved mechanical strength.

Briefly stated, the present invention provides a method for preparing a sintered zirconia body in sheet form. A green sheet of zirconia is fired while a weight is placed on the sheet to apply a load thereto.

DETAILED DESCRIPTION OF THE INVENTION

The method for preparing a sintered zirconia body in sheet form according to the present invention uses a weight for applying a load to a green sheet of zirconia which is then fired under the load. The green sheet used herein may be prepared by conventional methods including doctor blade, extrusion, calender roll and press methods. The green sheet has length, width and thickness dimensions which may be determined from the desired length, width and thickness dimensions of a sintered sheet and an expected linear shrinkage factor upon firing. The surface area of the sheet refers to one major surface of the sheet generally defined by its length and width. The zirconia powder of which the green sheet is prepared has been partially or fully stabilized by adding a stabilizer element thereto. Exemplary stabilizer elements include yttrium, calcium, magnesium, and lanthanides such as ytterbium and cerium, with yttrium and ytterbium being preferred.

In firing a green sheet in a conventional manner, that is, without using a weight or applying a load to the sheet, the sheet tends to become cambered or wavy upon firing when the sheet is thinner than 1 mm and particularly when the sheet is thinner than 0.5 mm. The frequency of cracking and breakage caused by camber and waviness increases when the surface area is larger than 10 cm by 10 cm. The degree of breakage is enhanced as the surface area to thickness ratio or length to thickness ratio increases.

The method of firing a green sheet under a load according to the present invention is at a glance similar to the prior art technique of re-firing a once sintered sheet under a load for offsetting camber or waviness, but is essentially different from the prior art technique. The distortion once introduced by firing in the prior art technique can partially remain as residual strains even after offsetting by re-firing, leading to a lowering of strength. Also, if substantial deformation is introduced by re-firing, the sintered sheet loses dimensional precision. In contrast, the present method in which a weight is rested on the entire (upper) surface of the green sheet allows the green sheet to be fired without introducing camber or waviness so that the sintered sheet is improved in denseness, surface smoothness, and dimensional precision. These advantages become more outstanding when sintered sheets have a thickness of up to 0.5 mm, especially up to 0.3 mm, and have a length to thickness ratio of at least 500, especially at least 1000. The lower limit of the thickness may be 0.01 mm and the upper limit of the length to thickness ratio may be 5000.

In firing a green sheet under a load according to the present invention, uniform loading of the sheet is critical. For a larger sheet, for example, having a surface area of at least 15 cm by 15 cm, especially at least 20 cm by 20 cm, it is advantageous to place a plurality of weights on the sheet.

Assume that each weight has a weight per unit area $W$ (g/cm$^2$), and a surface area $S$ (cm$^2$) and a load per unit area $G$ (g/cm$^2$) is applied to the sheet. Note that the surface area of the weight refers to that surface of the weight facing or overlying the green sheet, and for a rectangular weight plate as is most often the case, the weight surface area is the area of the lower major surface of the plate. In the practice of the invention, it is preferred to satisfy the following conditions:

$S \leq 200$, more preferably $S \leq 150$, most preferably $S \leq 100$, $G \leq 5$, more preferably $G \leq 2$, most preferably $G \leq 1.5$, and $1 \geq W/G \geq 0.5$, more preferably $W/G \geq 0.7$, most preferably $W/G \geq 0.8$.

It is to be understood that a sintered sheet has a surface area $X$ cm$^2$ and a green sheet having a coefficient of linear shrinkage $y$ has a surface area $X \cdot (1/y)^2$. When $N$ weight plates having a weight per unit area $W$ (g/cm$^2$) and a surface area $S$ (cm$^2$) are placed on the green sheet, the following equation is given.

$$X \cdot (1/y)^2 \cdot G = S \cdot W \cdot N$$

In the examples described later, $1/y = 1.3$.

The weight is preferably formed of a material which is substantially inert to reaction with zirconia and resistant to the firing temperature, for example, porous alumina. The weight preferably has a porosity of 5 to 30%, more preferably 10 to 20%. A weight having a porosity of less than 5% would inhibit escaping of gases from the sheet for binder removal, resulting in a sintered sheet prone to breakage. A weight having a porosity of more than 30% is too weak to handle. The shape of the weight is not critical although plate shape is preferred when a plurality of weights are used in juxtaposition. The surface portion of the weight which comes in contact with the green sheet should preferably be flat and smooth and more preferably be surface polished.

Often the green sheet rests on a setter which may be formed of the same heat resistant material as the weight. The material of which the setter is made should preferably have a negligibly low creep deformation at the firing temperature. The setter preferably has a thickness of at least 5 mm, more preferably at least 1 cm, most preferably at least 2 cm for creep prevention. The setter should have a larger surface area than the green sheet so that the green sheet may rest thereon.

The green sheet is generally fired at a temperature of 1,300° to 1,600° C., preferably 1,350° to 1,500° C., for about 10 minutes to about 10 hours, preferably about 1 to 4 hours. The heating rate is generally about 5° C./min. or less. It is important that the heating rate be lower from the start of firing shrinkage. The heating rate during firing shrinkage is preferably up to 1.5° C./min., more preferably up to 1° C./min., most preferably up to 0.5° C./min.

The sintered zirconia body in sheet form prepared by the present method is characterized by denseness, flatness and freedom from camber or waviness. It finds use as electrolyte membranes in sensors and fuel cells by utilizing the nature of solid electrolyte and as industrial jigs such as firing setters.

EXAMPLE

Examples of the present invention are given below by way of illustration and not by way of limitation.

Examples 1-12 & Comparative Examples 1-4

Sheet forming slurries were prepared using two types of raw materials A1 and A2, deflocculant, binder, and solvent.

Zirconia powder raw material A1 was a zirconia powder containing 3 mol % of $Y_2O_3$, having a mean particle size of 0.2 μm as measured by a centrifugal sedimentation method and a specific surface area of 9 $m^2/g$ as measured by BET (prepared by the method of JP-A 185821/1988). Zirconia powder raw material A2 was a zirconia powder containing 8 mol % of $Y_2O_3$, having a mean particle size of 0.22 μm as measured by a centrifugal sedimentation method and a specific surface area of 8.7 $m^2/g$ as measured by BET (prepared by the method of JP-A 185821/1988 or U.S. Pat. No. 4,985,229). The deflocculant was ammonium polycarboxylate with 40% by weight solids. The binder was a water-soluble acrylic resin with 40% by weight solids. The solvent was distilled water.

A slurry having a solid concentration of 80% was prepared by dispersing 100 parts by weight of zirconia powder in distilled water with the aid of the deflocculant. Further, the organic binder was added to the slurry in an amount of 20 parts calculated as solids. The mixture was milled for three days in a ball mill using grinding media of zirconia. An anti-foaming agent was added in two portions, one portion being 0.03 parts along with the organic binder and the other portion being 0.07 parts immediately before the end of milling. The thus obtained sheet forming slurry composition was deaerated and adjusted for viscosity by means of a vacuum deaerator. The composition had a viscosity of about 15,000 centipoise at the end of adjustment.

A green sheet was prepared by applying the slurry to a carrier tape by means of a conventional doctor blade apparatus. The carrier tape was fed at a rate of 10 m/hour and the doctor blade to carrier tape spacing was adjusted in accordance with the desired sheet thickness. The coating was dried by heating it with hot air at a rate of 2° C./min. up to about 130° C.

The green sheet was cut to a piece of a predetermined size. The sheet was rested on a setter in an electric oven and one or more weight plates were placed on the sheet. Both the setter and weight plates were made of alumina having a porosity of about 15%. When more than one weight plate was used, they were of the same dimensions and placed side by side. The sheet was then fired by heating it at a rate of 0.5° C./min. (during firing shrinkage) to 1450° C. and maintaining at the temperature for two hours. The loading conditions are shown in Table 1 together with the evaluation of the sintered sheet.

In Table 1, samples outside the numerical limits according to the preferred embodiment of the invention are also reported as Comparative Examples 1 to 4. The samples were rated "⊚" when no damage was found, "○" when they were acceptable in practice, and "X" when they broke down.

TABLE 1

| | | | Sintered sheet | | Weight plate | | | | | |
|---|---|---|---|---|---|---|---|---|---|---|
| | | Raw powder | Size (mm × mm) | Thickness (mm) | W (g/cm²) | S (cm²) | G (g/cm²) | Number of plates | W/G | Evaluation |
| Example | 1 | A1 | 50 × 50 | 0.2 | 1.22 | 72 | 2.08 | 1 | 0.59 | ⊚ |
| | 2 | A2 | 50 × 50 | 0.2 | 1.22 | 72 | 2.08 | 1 | 0.59 | ⊚ |
| | 3 | A1 | 50 × 50 | 0.2 | 1.51 | 81 | 2.89 | 1 | 0.52 | ⊚ |
| | 4 | A2 | 50 × 50 | 0.2 | 1.51 | 81 | 2.89 | 1 | 0.52 | ⊚ |
| | 5 | A1 | 50 × 50 | 0.2 | 2.44 | 72 | 4.16 | 1 | 0.59 | ○ |
| | 6 | A2 | 50 × 50 | 0.2 | 2.44 | 72 | 4.16 | 1 | 0.59 | ○ |
| | 7 | A1 | 100 × 100 | 0.2 | 1.52 | 196 | 1.76 | 1 | 0.86 | ○ |
| | 8 | A2 | 100 × 100 | 0.2 | 1.52 | 196 | 1.76 | 1 | 0.86 | ○ |
| | 9 | A1 | 100 × 100 | 0.2 | 1.46 | 49 | 1.69 | 4 | 0.86 | ⊚ |
| | 10 | A2 | 100 × 100 | 0.2 | 1.46 | 49 | 1.69 | 4 | 0.86 | ⊚ |
| | 11 | A1 | 200 × 200 | 0.2 | 0.94 | 81 | 1.01 | 9 | 0.93 | ⊚ |
| | 12 | A2 | 200 × 200 | 0.2 | 0.94 | 81 | 1.01 | 9 | 0.93 | ⊚ |

TABLE 1-continued

|  |  | Raw powder | Sintered sheet | | Weight plate | | | | | |
|---|---|---|---|---|---|---|---|---|---|---|
|  |  |  | Size (mm × mm) | Thickness (mm) | W (g/cm$^2$) | S (cm$^2$) | G (g/cm$^2$) | Number of plates | W/G | Evaluation |
| Comparative Example | 1 | A1 | 100 × 100 | 0.2 | 2.34 | 300 | 4.15 | 1 | 0.56 | X |
|  | 2 | A2 | 100 × 100 | 0.2 | 2.34 | 300 | 4.15 | 1 | 0.56 | X |
|  | 3 | A1 | 200 × 200 | 0.2 | 1.89 | 729 | 2.04 | 1 | 0.93 | X |
|  | 4 | A2 | 200 × 200 | 0.2 | 1.89 | 729 | 2.04 | 1 | 0.93 | X |

Although some preferred embodiments have been described, many modifications and variations may be made thereto in the light of the above teachings. It is therefore to be understood that within the scope of the appended claims, the invention may be practiced otherwise than as specifically described.

We claim:

1. A method for preparing a sintered zirconia body in sheet form, comprising the step of firing a green sheet of zirconia having a thickness of less than 1 mm and a surface area of more than 10 cm by 10 cm while placing at least one weight on said green sheet to apply a load thereto, wherein said weight having a weight per unit area W (g/cm$^2$) and a surface area S (cm$^2$) is placed on said green sheet to apply a load per unit area G (g/cm$^2$) to said green sheet so as to satisfy the following conditions $S \leq 200$, about $1.01 \leq G \leq 5$, and $1 \geq W/G \geq 0.5$, thereby producing a sintered zirconia body in sheet form having a thickness of 0.01 to 0.5 mm and a length to thickness ratio of 500 to 5,000.

2. The method of claim 1, wherein said weight is made of a porous material having a porosity of 5 to 30%.

3. The method of claim 1, wherein said green sheet of zirconia is prepared from zirconia powder which has been partially or fully stabilized by adding a stabilizer element thereto.

4. The method of claim 3, wherein said stabilizer element is a member selected from the group consisting of yttrium, calcium, magnesium, and a lanthanide.

5. The method of claim 4, wherein said lanthanide is a member selected from the group consisting of ytterbium and cerium.

6. The method of claim 4, wherein said stabilizer element is a member selected from the group consisting of yttrium and ytterbium.

7. The method of claim 1, wherein said sintered zirconia body in sheet form has a thickness of up to 0.3 mm and a thickness ratio of at least 1,000.

8. The method of claim 1, wherein $S \leq 150$, $G \leq 5$, and $W/G \geq 0.7$.

9. The method of claim 1, wherein said weight is porous alumina.

10. The method of claim 2, wherein said weight is made of a porous material having a porosity of 10 to 20%.

11. The method of claim 1, wherein said firing is conducted at a temperature of 1,300° to 1,600° C. for about 10 minutes to about 10 hours at a heating rate of about 5° C. per minute or less.

12. The method of claim 1, wherein said firing is conducted at a temperature of 1,350° to 1,500° C. for about 10 minutes to about 10 hours at a heating rate of about 5° C. per minute or less.

13. The method of claim 11, wherein said firing is conducted for about 1 to 4 hours.

14. The method of claim 12, wherein said firing is conducted for about 1 to 4 hours.

15. The method of claim 11, wherein said heating rate during firing shrinkage is in the range from up to 0.5° C. per minute to up to 1.5° C. per minute.

16. The method of claim 12, wherein said heating rate during firing shrinkage is in the range from up to 0.5° C. per minute to up to 1.5° C. per minute.

17. The method of claim 1, wherein said green sheet rests on a setter having a thickness of at least 5 mm.

18. A method for preparing a sintered zirconia body in sheet form, comprising the step of firing a green sheet of zirconia having a thickness of less than 1 mm and a surface area of at least 15 cm by 15 cm while placing a plurality of weights on said green sheet to apply a load thereto, wherein said weights having a weight per unit area W (g/cm$^2$) and a surface area S (cm$^2$) are placed on said green sheet to apply a load per unit area G (g/cm$^2$) to said green sheet so as to satisfy the following conditions:

$S \leq 200$, about $1.01 \leq G \leq 5$, and $1 \geq W/G \geq 0.5$, thereby producing a sintered zirconia body in sheet form having a thickness of 0.01 to 0.5 mm and a length to thickness ratio of 500 to 5,000.

* * * * *